US012317374B2

(12) United States Patent
Seok et al.

(10) Patent No.: US 12,317,374 B2
(45) Date of Patent: *May 27, 2025

(54) APPARATUS AND METHODS FOR PROXY ADDRESS RESOLUTION PROTOCOL (ARP) SERVICE FOR MULTI-LINK OPERATION

(71) Applicant: MediaTek Singapore Pte. Ltd., Singapore (SG)

(72) Inventors: Yongho Seok, San Jose, CA (US); Kai Ying Lu, San Jose, CA (US); James Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,587

(22) Filed: Jan. 23, 2024

(65) Prior Publication Data

US 2024/0251235 A1 Jul. 25, 2024

Related U.S. Application Data

(63) Continuation of application No. 17/219,693, filed on Mar. 31, 2021, now Pat. No. 11,882,625.

(60) Provisional application No. 63/025,238, filed on May 15, 2020, provisional application No. 63/006,139, filed on Apr. 7, 2020.

(51) Int. Cl.

| | |
|---|---|
| ***H04W 8/24*** | (2009.01) |
| ***H04L 61/103*** | (2022.01) |
| ***H04L 101/622*** | (2022.01) |
| ***H04W 72/0446*** | (2023.01) |
| ***H04W 72/53*** | (2023.01) |

(52) U.S. Cl.
CPC ............. *H04W 8/24* (2013.01); *H04L 61/103* (2013.01); *H04W 72/0446* (2013.01); *H04W 72/53* (2023.01); *H04L 2101/622* (2022.05)

(58) Field of Classification Search
None
See application file for complete search history.

(56) References Cited

U.S. PATENT DOCUMENTS 8,576,844 B1 * 11/2013 Ghosh .................. H04L 61/103 370/390
11,882,625 B2 1/2024 Seok et al.
(Continued)

FOREIGN PATENT DOCUMENTS

| | | | |
|---|---|---|---|
| EP | 2667682 | A1 | 5/2012 |
| WO | 2019085822 | A1 | 5/2019 |

OTHER PUBLICATIONS

Yongho Seok (MediaTek), “Group addressed frame transmission in constrained multi-link operation”, IEEE 802.11-20/0329r4, Jan. 2020 (Year: 2020).*

(Continued)

*Primary Examiner* — Walter J Divito

(57) ABSTRACT

Embodiments of the present invention are drawn to electronic systems capable of transmitting a group addressed frame that identifies an MLD according to an MLD MAC address. The group addressed frame can include an ARP request, for example, and can be transmitted by an AP MLD responsive to an individually addressed frame transmitted by a non-AP STA MLD associated with the AP MLD. The AP MLD can provide a proxy ARP service for associated non-AP STA MLDs.

20 Claims, 11 Drawing Sheets

600

AP1 605

Request frame for multi-link setup 615

Response frame for multi-link setup 620

Non-AP STA1 610

(56) References Cited

U.S. PATENT DOCUMENTS

| | | | |
|---|---|---|---|
| 2006/0187873 A1 | 8/2006 | Friday et al. | |
| 2007/0097919 A1 | 5/2007 | Tsubota | |
| 2013/0100874 A1 | 4/2013 | Seok | |
| 2019/0029024 A1 | 1/2019 | Ryu et al. | |
| 2019/0215884 A1 | 7/2019 | Patil et al. | |
| 2019/0268956 A1 | 8/2019 | Xiao et al. | |
| 2020/0213269 A1* | 7/2020 | Nayak | H04L 61/5092 |
| 2020/0396568 A1 | 12/2020 | Huang et al. | |
| 2021/0014911 A1 | 1/2021 | Patil et al. | |
| 2021/0076412 A1 | 3/2021 | Naribole et al. | |
| 2021/0144698 A1 | 5/2021 | Kwon et al. | |
| 2021/0144787 A1 | 5/2021 | Kwon et al. | |
| 2021/0176033 A1 | 6/2021 | Oteri et al. | |
| 2021/0195540 A1 | 6/2021 | Fischer | |

OTHER PUBLICATIONS

Insun Jang (LG Electronics), "Considerations for Multi-link Channel Access Without Simultaneous TX/RX Capability", IEEE 802.11-19/1917r0, Nov. 2019 (Year: 2019).*

Poa-Kai Huang (Intel): "MLD MAC address and WM address", IEEE Draft; 11-20-0054-02-00BE-MLD-AC-Address-And-WM-Address, IEEE-SA Mentor, Piscataway, NJ USA, vol. 802.11 EHT; 802.11be, No. 2 Mar. 17, 2020 (Mar. 17, 2020), pp. 1-16, XP068167133, Retrieved from the Internet: URL: https://mentor.ieee.org/802.11/dcn/20/11-20-0054-02-00be-mld-mac-address-and-wm-address.pptx [retrieved on Mar. 17, 2020] pp. 9-12.

Gabor Bajko (MediaTek): "ProxyARP CR", IEEE Draft; 11-14-1173-02-000M-PROXYARP-CR, IEEE-SA Mentor, Piscataway, NJ USA, vol. 802. 11 m, No. 2 Jan. 12, 2015 (Jan. 12, 2015), pp. 1-4,XP068157387, Retrieved from the Internet: URL:https://mentor.ieee.org/802.11 /dcn/14/11-14-1173-02-000m-proxyarpcr.docx [retrieved on Jan. 12, 2015].

Duncan Ho (Qualcomm) "MLA: Group addressed frames delivery", IEEE Draft;11-20-0442-00-00BE-MLA-Group-Addressed-Frames-Delivery, IEEE-SA Mentor, Piscataway, NJ USAvol. 802.11 EHT; 802.Ilbe Apr. 30, 2020 (Apr. 30, 2020), pp. 1-10,XP068172765, Retrieve from the Internet: URL:https://mentor.ieee.org/802.11/dcn/20/11-20-0442-00-00be-mla-group-addressed-frames-delivery.pptx[retrieved on Apr. 30, 2020] * pp. 4,6 *.

Duncan; et al. "Group Addressed Frame Delivery for EHT" doc.: IEEE 802.11-20/0442r0; 10 pp. Mar. 2020.

Huang; et al; "MLD MAC Address and WM Address" doc.: IEEE 802.11-20/0054r2; 16 pp. Jan. 2020.

Innovation; Summary Table; Search Report; Results Priority Date Range: May 9, 2008-Feb. 11, 2020; 20 pp. Report Run Date: Jul. 6, 2022.

* cited by examiner

| ARP Request Frame (Individually Addressed MPDU)<br>Non-AP MLD Transmits to AP MLD<br>505 | | | |
|---|---|---|---|
| **Address 1** | **Address 2** | **Address 3** | **Target IP** |
| MAC Address of AP1 | MAC Address of STA1 | Group MAC Address | Target STA IP address |

FIG. 5A

| ARP Request Frame (Group Addressed MPDU)<br>AP MLD broadcasts group address frame<br>550 | | | |
|---|---|---|---|
| **Address 1** | **Address 2** | **Address 3** | **Target IP** |
| Group MAC Address | AP1 MAC Address<br>AP2 MAC Address<br>AP 3 MAC Address | STA MLD MAC Address | Target STA IP address |

FIG 5B

APPARATUS AND METHODS FOR PROXY ADDRESS RESOLUTION PROTOCOL (ARP) SERVICE FOR MULTI-LINK OPERATION

CROSS-REFERENCE TO RELATED APPLICATIONS

This application is a continuation of and claims priority and benefit of copending U.S. patent application Ser. No. 17/219,693, filed Mar. 31, 2021, having the entire content of which is hereby incorporated by reference for all purposes. This application also claims the benefit of and priority to provisional patent application Ser. No. 63/006,139, with filing date Apr. 7, 2020, and provisional patent application Ser. No. 63/025,238, with filing date May 15, 2020, which are hereby incorporated by reference in their entirety.

FIELD

Embodiments of the present invention generally relate to the field of wireless communications. More specifically, embodiments of the present invention relate to systems and methods for wireless transmission by a multi-link device.

BACKGROUND

Modern electronic devices typically send and receive data with other electronic devices wirelessly e.g., using Wi-Fi, and many of these devices are "dual band" devices that include at least two wireless transceivers capable of operating in different frequency bands, e.g., 2.4 GHz, 5 GHZ, and 6 GHz. In most cases, a wireless device will communicate over only a single band at a time. For example, older and low-power devices, e.g., battery powered devices, often operate on the 2.4 GHz band. Newer devices and those devices that require greater bandwidth often operate on the 5 GHz band. The availability of the 6 GHz band is a recent advancement and can provide higher performance, lower latency, and faster data rates.

In some cases, the use of a single band may not satisfy the bandwidth needs of certain devices. Therefore, some developing approaches to wireless communication increase communication bandwidth by operating on multiple bands concurrently (this type of communication is technically called link aggregation or multi-link operation). Multi-link operations can provide higher network throughput and improved network flexibility compared to traditional techniques for wireless communication. Moreover, using multi-links enables a wireless device to connect to different wireless bands depending on the conditions of those bands (e.g., traffic, interference, capabilities, etc.), and to switch between the different bands as necessary.

Unfortunately, when a multi-link device (MLD) sends and receives data simultaneously over multiple wireless links in a multi-link operation, in-device coexistence (IDC) interference can cause substantial performance loss during wireless communications. IDC interference caused by simultaneous transmission and reception over a 2.4 GHz band and 5 GHz band is typically negligible. However, IDC interference caused by simultaneous transmission and reception over a 5 GHz band and 6 GHz band can substantially impact performance and lead to frequent packet loss. Therefore, for avoiding the IDC interference, a wireless device should not transmit and receive frames on multi-link simultaneously. Moreover, a novel approach to addressing and frame delivery is needed to transmit and deliver frames, such as group addressed frames, between MLDs to improve network performance and reliability.

SUMMARY

To perform reliable multi-link operations, MLDs and their associated wireless STAs must be distinguishable during multi-link operations. Therefore, what is needed is an approach to addressing and frame deliver for multi-link devices so that an MLD can be identified among many MLDs in a wireless network, and so that frames can be scheduled and routed between devices during multi-link operations. Accordingly, embodiments of the present invention provide techniques for wirelessly transmitting frames over multiple links in a multi-link operation using MLDs (e.g., an AP MLD and a non-AP STA MLD) having multiple wireless stations (STAs) using novel methods of addressing for uniquely identifying the MLDs. Some embodiments provide a proxy address resolution protocol (proxy ARP) for broadcasting messages in a wireless network using MAC addresses to advantageously distinguish and identify MLDs among the MLDs of the wireless network. In this way, the reliability of multi-link operations is improved.

According to one disclosed embodiment, a method of group addressed frame delivery by a multi-link device in a wireless network is disclosed. The method includes transmitting an individually addressed MPDU to an access point multi-link device from an STA of a non-AP STA MLD. The individually addressed MPDU includes a MAC address identifying an AP of the AP MLD, a MAC address of the STA of the non-AP STA MLD, and a group MAC address for transmitting a group addressed MPDU. The method further includes receiving the group addressed MPDU transmitted to the group MAC address.

According to some embodiments, the method includes determining that the group addressed MPDU is a duplicate of the individually addressed MPDU.

According to some embodiments, the group addressed MPDU includes an MLD MAC address associated with the non-AP STA MLD, and where the determining that the group addressed MPDU is a duplicate of the individually addressed MPDU further includes determining that the MLD MAC address of the group addressed MPDU identifies the non-AP STA MLD.

According to some embodiments, the group addressed MPDU includes an MLD MAC address associated with the non-AP STA MLD, and where the determining that the group addressed MPDU is a duplicate of the individually addressed MPDU further includes determining that the MLD MAC address of the group addressed MPDU identifies the STA of the non-AP STA MLD.

According to some embodiments, the method includes filtering out the group addressed MPDU responsive to the determining.

According to some embodiments, the group addressed MPDU includes the group MAC address, a plurality of addresses identifying respective APs of the AP MLD that transmit the group addressed MPDU, and an MLD MAC Address of the non-AP STA MLD.

According to some embodiments, the AP MLD is operable to transmit the group addressed frame responsive to the individually addressed MPDU.

According to a different embodiment, a method of group addressed frame delivery by a multi-link device in a wireless network is disclosed. The method includes receiving an individually addressed MPDU at an access point (AP)

multi-link device (MLD) from an STA of a non-AP STA MLD. The individually addressed MPDU includes a MAC address identifying an AP of the AP MLD, a MAC address of the STA of the non-AP STA MLD, and a group MAC address for transmitting a group addressed MPDU. The method further includes transmitting the group addressed MPDU by a plurality of APs of the AP MLD, the group addressed MPDU including the group MAC Address, a plurality of MAC addresses identifying the plurality of APs of the AP MLD that transmit the group addressed MPDU, and an MLD MAC Address of the non-AP STA MLD.

According to some embodiments, the method further includes performing a multi-link setup procedure with the non-AP STA MLD.

According to some embodiments, the multi-link setup procedure includes the AP MLD receiving the MLD MAC address of the non-AP STA MLD during the multi-link setup procedure.

According to some embodiments, where the MLD MAC address is included in an association request frame.

According to some embodiments, the method includes setting a Proxy ARP field to 1 in an Extended Capabilities element of a frame transmitted to the non-AP STA MLD.

According to some embodiments, the method includes maintaining an MLD MAC Address to IP mapping including a mapping of the MLD MAC Address of the non-AP STA MLD to an IP of the non-AP STA MLD.

According to some embodiments, the method includes updating the MLD MAC Address to IP mapping when the IP of the STA MLD changes.

According to some embodiments, the method includes transmitting an extended capabilities information element of a frame having a field indicating that proxy ARP is enabled, generating a mapping of MLD MAC addresses to IP addresses for a plurality of MLDs of the wireless network, receiving a first ARP request frame in an individually addressed MPDU from an a non-AP STA MLD of the plurality of MLDs, and broadcasting a second ARP request frame in a group addressed MPDU over multiple wireless links according to the first ARP request frame and the mapping of MLD MAC addresses to IP addresses.

According to some embodiments, the first ARP request frame includes a MAC address identifying an AP of an AP MLD, a MAC address of the an STA of the non-AP STA MLD, and a group MAC address for transmitting the group addressed MPDU.

According to some embodiments, the second ARP request frame includes the group MAC Address, a plurality of MAC addresses identifying a plurality of APs of an AP MLD that transmit the group addressed MPDU, and an MLD MAC Address of the non-AP STA MLD.

According to some embodiments, the method further includes performing a multi-link setup procedure with the non-AP STA MLD to determine the MLD MAC address of the non-AP STA MLD.

According to some embodiments, the method includes responding on behalf of the non-AP STA MLD to a third APR request.

According to some embodiments, the method includes responding to an Internet Control Message Protocol version 6 (IMPv6) Neighbor Solicitation message on behalf of the non-AP STA MLD, and transmitting an unsolicited Neighbor Advertisement Messages on behalf of the STA MLD when an IP address of the non-AP STA MLD changes.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5A depicts an exemplary individually addressed frame transmitted by a non-AP STA MLD to an AP MLD for broadcasting a group addressed frame over multiple wireless links according to embodiments of the present invention.

FIG. 5B depicts an exemplary group addressed frame transmitted by an AP MLD over multiple wireless links according to embodiments of the present invention.

DETAILED DESCRIPTION

Figure 1:
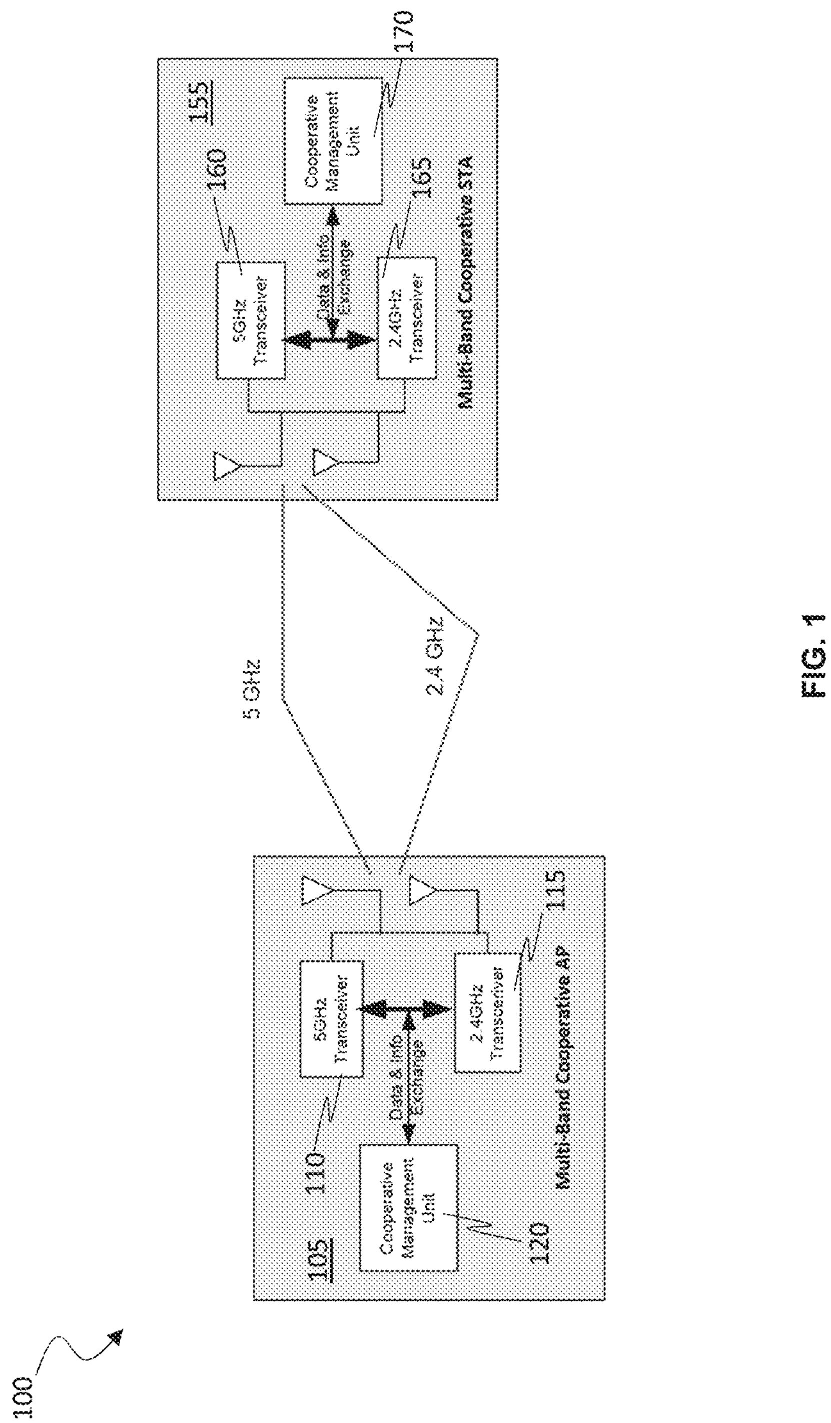
FIG. 1 is a block diagram of an exemplary wireless communication system including a multi-link cooperative AP and a multi-link cooperative STA according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 8-10) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic announces capable of being stored, transferred, combined, compared, and otherwise manipulated in a computer system. It has proven convenient at times, principally for reasons of common usage, to refer to these announces as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "measuring," "accessing," "configuring," "setting," "storing," "transmitting," "retransmitting," "receiving," "generating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Addressing Techniques for Multi-Link Devices

As used herein, the term "EHT" refers generally to a recent generation of wireless communication (e.g., Wi-Fi) known as Extremely High Throughput (EHT), the term "VHT" refers generally to wireless communication technology known as Very High Throughput (VHT), and the term HE refers generally to wireless communication technology known as "High Efficiency." The term station (STA) refers generally to an electronic device capable of sending and receiving data over a Wi-Fi network. A wireless STA may be configured to act as a wireless access point (AP) or non-AP STA. A multi-link device (MLD) includes multiple wireless STAs that can operate over different wireless links.

Multi-link operations performed by multi-link devices can provide higher network throughput and improved network flexibility compared to traditional techniques for wireless communication. Embodiments of the present invention provide techniques for simultaneously transmitting frames over multiple links in a multi-link operation between wireless devices using a synchronized transmission opportunity (TXOP). According to some embodiments, slot boundaries of the multiple links are brought into alignment so that a TXOP can be obtained over the multiple links.

Embodiments of the present invention are drawn to electronic systems capable of transmitting a group addressed frame that identifies an MLD according to an MLD MAC address. The group addressed frame can include an ARP request, for example, and can be transmitted by an AP MLD responsive to an individually addressed frame transmitted by a non-AP STA MLD associated with the AP MLD. The AP MLD can provide a proxy ARP service for associated non-AP STA MLDs.

With regard to FIG. 1, an exemplary wireless communication system 100 including a multi-link cooperative AP 105 and a multi-link cooperative STA 155 is depicted according to embodiments of the present invention. The multi-link cooperative AP 105 includes a 5 GHz transceiver 110 and a 2.4 GHz transceiver 115. The transceivers 110 and 115 of AP 105 exchange data and information with cooperative management unit 120 that coordinates information sent and/or received by transceivers 110 and 115.

Multi-link cooperative ST 155 includes a 5 GHz transceiver 160 and a 2.4 GHz transceiver 165. Other types of transceivers that operate on different bands, such as 6 GHz and above, can also be used by the multi-link cooperative STA 155 according to some embodiments of the present invention. Cooperative management unit 170 coordinates information sent and received by transceivers 160 and 165 using 5 GHz band wireless communication and 2.4 GHz band wireless communication, respectively, although any well-known wireless communication band (e.g., 6 GHZ) can be used. STA 155 transmitting frames using multiple bands simultaneously can mitigate delay and improve peak throughput of STA 155.

In some cases, transmitting frames using multiple bands simultaneously can degrade the performance of the basic service set (BSS) comprising STA 155. For example, the performance of the BSS can be degraded when STA 155 operating on multiple bands simultaneously uses a substantial amount of the bandwidth available to the BSS due to the increased traffic. Therefore, the AP 105 can control which STAs are granted multi-link channel access, and the access can be terminated by the AP at any time, for example, based on changing network conditions, requirements, and priorities.

Depending on certain conditions, such as traffic load, a non-AP STA MLD may use fewer than all supported/available links in order to reduce energy consumption. Moreover, a non-AP STA may apply independent power management for each link, and the AP can provide TID-to-link mapping information for each link. Depending on the Quality of Service (QOS) policy of the Basic Service Set (BSS), an AP may allocate the traffic to different links based on traffic type, such as voice, video, data, etc. For example, frames belonging to a first Traffic Identifier (TID 1) can be allocated to a first link, and frames belonging to a second Traffic Identifier (TID 2) can be allocated to a second link. In this case, the AP may provide the TID-to-link mapping information for both links to the wireless STA, where some data is transmitted or scheduled on the first link, and other data is transmitted or scheduled on the second link.

Data transmitted over a first wireless link, such as the 5 GHz wireless link provided by 5 GHz transceiver 110 or 160, can be retransmitted over a different wireless link. For example, if a data transmission over the 5 GHz wireless link is sent unsuccessfully (e.g., no acknowledgment received), the data can be retransmitted over the 2.4 GHz wireless link provided by 2.4 GHz transceiver 115/165. The data transmission (e.g., a PPDU) can be originally encoded for transmission on a first wireless link (e.g., a 2.4 GHz or 5 GHz wireless link), and the retransmitted data can be prepared for transmission according to embodiments of the present invention described herein for encrypting data for retransmission in a multi-link environment.

Figure 2:
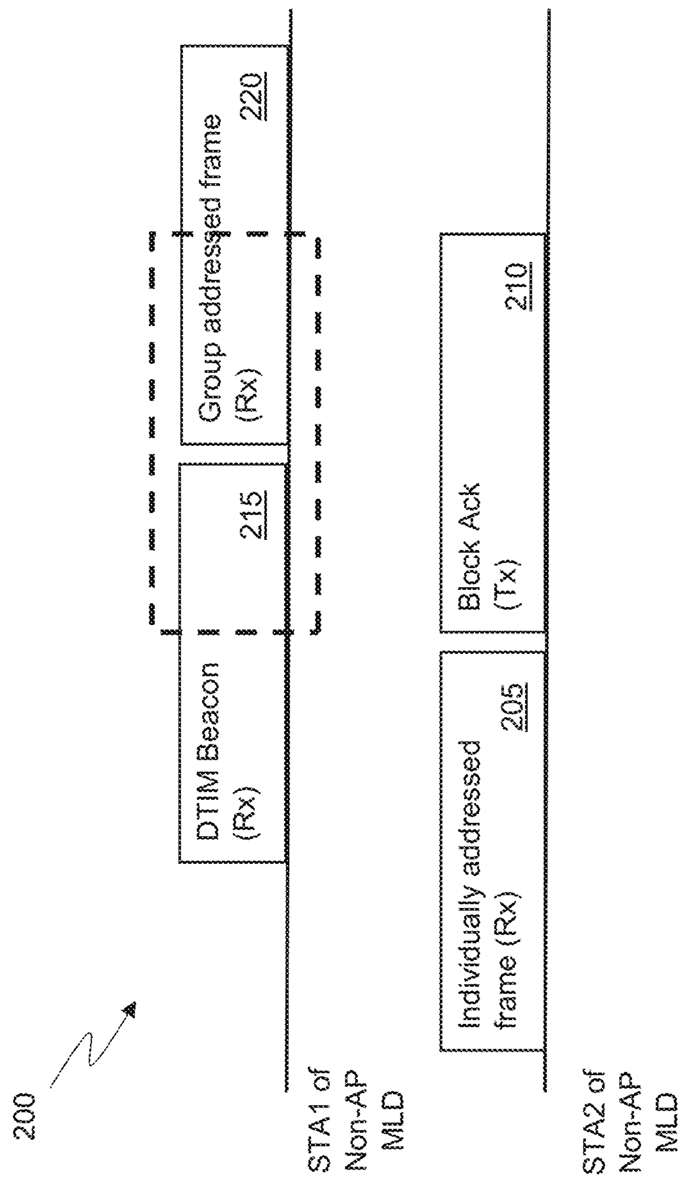
FIG. 2 is a block diagram depicting an exemplary transmission of an MLD using multiple links according to embodiments of the present invention. The MLD is a non-AP STA MLD and includes affiliated STAs STA1 and STA2 communicating over respective wireless links.

FIG. 2 depicts an exemplary transmission of an MLD using multiple links according to embodiments of the present invention. The MLD is a non-AP STA MLD and includes affiliated STAs STA1 and STA2 communicating over respective wireless links. In the example of FIG. 2, STA1 receives an individually addressed frame 205. In response, STA1 transmits a block ack (BA) 210 acknowledging the reception of frame 205. While STA1 is transmitting BA 210, STA2 simultaneously receives a delivery traffic indication map (DTIM) beacon frame 215. Group-addressed frame 220 is received by STA1 after the DTIM beacon frame 215 while the transmission of BA 210 is ongoing. STA1 and ST2 of the non-AP STA MLD are in communication with the AP MLD over a non-simultaneous transmit and receive (NSTR) link pair. For example, the NSTR link pair can include a 5 GHz wireless link and a 6 GHz wireless link where simultaneous transmission and reception over the links can cause IDC interference. For example, the simultaneous transmission and reception over STA2 and STA1 depicted in FIG. 2 causes IDC interference which can negatively impact the reliability and performance of wireless transmissions over these links. It is appreciated that, according to embodiments of the present invention, in order to reliably deliver a group addressed frame to a constrained non-AP STA MLD, the AP MLD does not schedule a frame exchange sequence to a constrained non-AP STA MLD that overlaps with a group addressed frame transmitted on another link or links.

Figure 3:
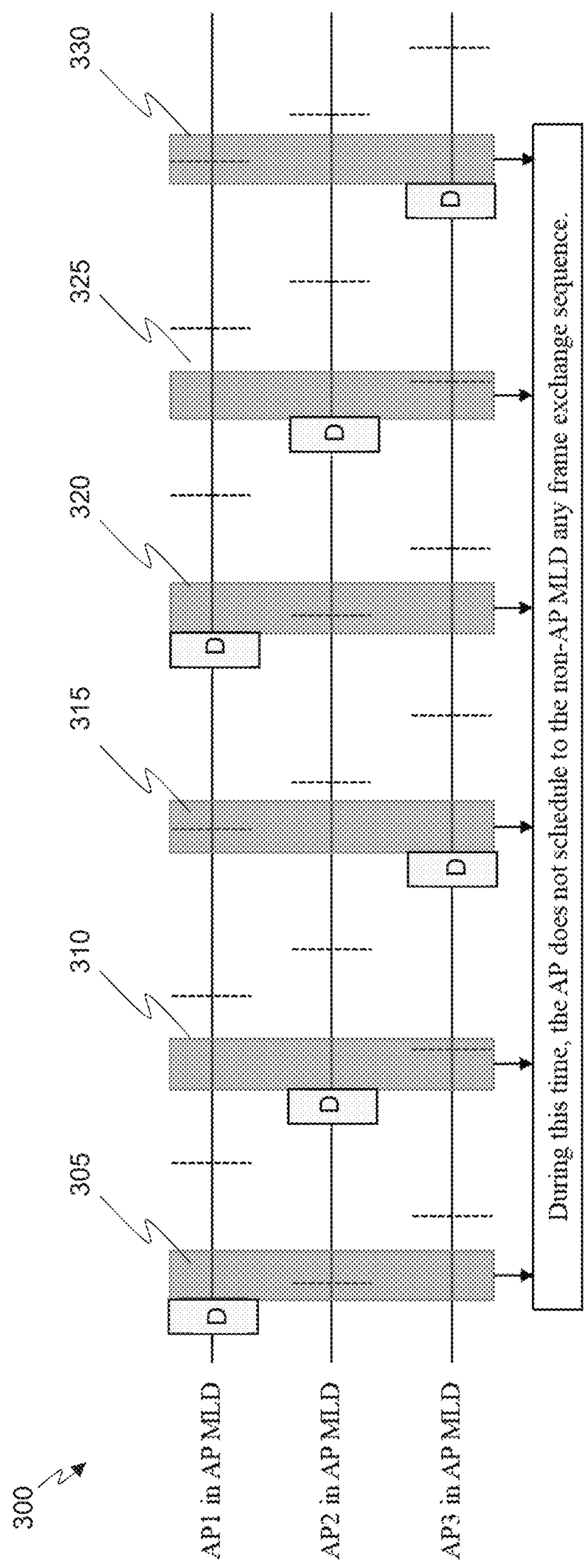
FIG. 3 is an exemplary transmission timing diagram depicting transmissions between MLD devices according to embodiments of the present invention.

FIG. 3 is an exemplary transmission timing diagram 300 depicting transmissions between MLD devices according to embodiments of the present invention. The frames are scheduled for transmission according to a process that prevents a constrained non-AP STA MLD from transmitting frames that would cause IDC interference without knowledge of the link(s) on which the constrained non-AP STA MLD is listening for group addressed frames. As depicted in FIG. 3, AP MLD includes AP1, AP2, and AP3. At times 305, 310, 315, 320, 325, and 330, the AP MLD advantageously does not schedule any frame exchange sequences to the non-AP STA MLD to prevent simultaneous transmission and reception during by the non-AP STA MLD during these times.

According to some embodiments, the non-AP STA MLD indicates to the AP MLD which link(s) are being used to listen for group addressed frames. Thereafter, the AP MLD does not schedule any frame exchange sequences to non-AP STA MLDs that overlap with the group addressed frame on the link or links indicated by the non-AP STA MLD ("configured link(s)"). Note in FIG. 3 that the AP MLD can transmit downlink data (D) (e.g., an individually addressed frame) at times that are not reserved for group addressed frame transmission as long as the transmission does not solicit an immediate response that would overlap with the group addressed frame transmission.

According to some embodiments, when a first STA in the STA multi-link device sends group addressed messages to a first AP in an associated AP multi-link device, the group addressed messages can also be broadcasted (e.g., rebroadcasted) by the AP multi-link device (e.g., by a second AP of the AP MLD). It is noted that the second STA in the STA multi-link device might receive both group addressed messages (the first group addressed message broadcasted by the STA MLD and the second group addressed message broadcast by the AP MLD. Because those group addressed messages are duplicate messages, the second STA of the STA MLD filters out (discards) any duplicate group addressed messages. For example, an STA in the STA multi-link device can filter out group addressed messages that include an STA in the same STA multi-link device as the source address. Therefore, it is important to identify when wireless devices are operating within the same MLD.

According to some embodiments, a wireless device will filter out received group addressed messages if the source address of the received group addressed messages is the same as an already received group addressed message. In one example, an AP multi-link device contains a first AP and a second AP having a first AP MAC address and a second AP MAC address, respectively. The first AP MAC address and second AP MAC address are different addresses. An STA multi-link device in communication with the AP MLD contains a first STA and a second STA having a first STA MAC address and a second STA MAC address, respectively. The first STA MAC address and a second STA MAC address are different addresses. The first STA and the second STA in the STA multi-link device transmit group addressed messages through an individually addressed MPDU to the first AP and the second AP in the AP multi-link device, respectively.

The first STA and the second STA in the STA multi-link device receive group addressed messages through a group addressed MPDU from the first AP and the second AP in the AP multi-link device, respectively. The first STA in the STA multi-link device filters out the received group addressed messages if the source address of the received group addressed messages is equal to either the first STA MAC address or the second STA MAC address. The second STA in the STA multi-link device filters out the received group addressed messages if the source address of the received group addressed messages is equal to either the first STA MAC address or the second STA MAC address.

Group Addressed Frame Delivery and Proxy Address Resolution Protocol (ARP) Service for Multi-Link Devices Embodiments of the present invention include methods for providing an automatic Proxy ARP service for multi-link operations in a wireless network. ARP enables a wireless device to use a known IP address to discover an unknown MAC address in a computer network. In contrast to traditional ARP, the novel Proxy ARP techniques disclosed herein enable a non-AP STA MLD to transmit an individually addressed frame to an associated AP MLD. The AP MLD broadcasts a proxy ARP request over multiple wireless links responsive to the individually addressed frame received from the associated non-AP STA MLD to identify an MLD MAC address of a device associated with a target IP address.

To configure Proxy ARP, an AP MLD sets the Proxy ARP field to 1 in an Extended Capabilities element. The AP MLD receives an ARP request frame from a non-AP STA MLD including a target IP address, and the AP MLD can broadcast the ARP request frame to associated devices using a group addressed frame. The AP MLD maintains a Hardware Address to Internet Address mapping for each associated wireless STA affiliated with a non-AP STA MLD and updates the mapping when the Internet Address of an associated wireless STA affiliated with a non-AP STA MLD changes. The mapping can be stored in an ARP table and used to respond to ARP requests and generate ARP request frames. When an IPv4 address being resolved in the ARP request is used by a non-AP STA MLD ("STA MLD") currently associated to the BSS, the proxy ARP service of the AP MLD responds to the ARP request (or an ARP probe) on behalf of the STA. When an AP receives an ARP request from an associated STA, or from the distribution system (DS) having a Target IP Address that corresponds to an associated STA, the AP uses the MAC address of the associated STA as the sender's MAC Address in the ARP response packet. When an IPV6 address is being resolved in the ARP request, the Proxy ARP service of the AP MLD responds to an Internet Control Message Protocol version 6 (ICMPv6) Neighbor Solicitation message with a Neighbor Advertisement message on behalf of an associated STA. When address mappings change, the AP can send unsolicited Neighbor Advertisement Messages on behalf of an STA.

According to some embodiments, an AP MLD enables Proxy ARP in a multi-link operation by setting the Proxy ARP field to 1 in an Extended Capabilities element of a frame transmitted by the AP MLD. The AP MLD maintains an MLD MAC Address to Internet Address (IP) mapping for each associated STA MLD, and updates the mapping when the Internet Address of the associated STA MLD changes. During the multi-link setup procedure, STA MLDs include an MLD MAC Address in the Association Request frame transmitted to an AP MLD. When an IPV4 address being resolved in the ARP request is used by an STA MLD currently associated with the BSS of the non-AP STA MLD, the proxy ARP service responds to an ARP request or an ARP probe on behalf of the STA MLD. When an AP in an AP MLD receives an ARP request from an associated STA MLD (or from the DS) with a Target IP Address that corresponds to a second associated STA MLD), the AP inserts the MLD MAC Address of the second STA MLD as the sender's MAC Address in the ARP response packet.

Figure 4:
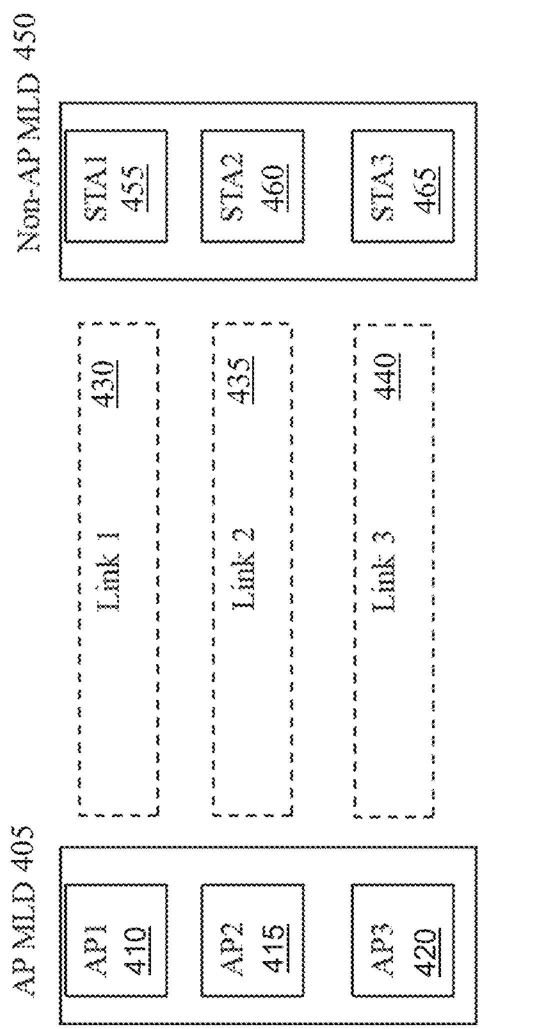
FIG. 4 depicts an exemplary wireless network including multi-link devices having 3 affiliated wireless STAs according to embodiments of the present invention.

With regard to FIG. 4, an exemplary wireless network 400 including multi-link devices 405 and 450 having 3 affiliated wireless STAs is depicted according to embodiments of the present invention. MLD 405 is configured as an AP MLD and includes affiliated APs AP1 (410), AP2 (415), and AP3 (420). Each affiliated AP is configured to communicate over a different wireless link (e.g., 2.4 GHz, 5 GHZ, or 6 GHz). MLD 450 is configured as a non-AP STA MLD and includes affiliated STAs STA1 (455), STA2 (460), and STA3 (465). Each affiliated STA is configured to communicate over a different wireless link (e.g., 2.4 GHz, 5 GHZ, or 6 GHZ). In the example of FIG. 1, AP1 and STA1 communicate over Link 1 (430), AP2 and STA2 communicate over Link 2 (435), and AP3 and STA3 communicate over Link 3 (440). AP MLD 405 and non-AP STA MLD 450 can perform multi-link operations using the available wireless links. Each STA and AP are associated with a unique MAC address. Further, each AP MLD and non-AP STA MLD are also associated with a unique MAC address (e.g., MLD MAC address). According to embodiments of the present invention. The AP MLD and non-AP STA MLD use the MLD MAC address to transmit, route and filter packets received wirelessly from other devices. In some embodiments, a non-AP MLD 450 transmits an individually addressed MSDU that causes AP MLD 405 to transmit a group addressed MSDU according to the address fields of the individually addressed MSDU.

To transmit a group addressed frame, an STA affiliated with an STA MLD can transmit an individually addressed MPDU to an AP of an associated AP MLD. The AP MLD can broadcast the grouped addressed message received from the STA over multiple wireless links. The individually addressed MPDU transmitted by the STA includes the following address fields:

1. Address 1 field set to the MAC Address of the AP.
2. Address 2 field set to the MAC Address of the STA.
3. Address 3 field set to the group MAC Address for broadcasting the group addressed frame.

Responsive to receiving the individually addressed frame transmitted by the STA of the STA MLD, all APs of the associated AP MLD can broadcast the received ARP Request frame through a group addressed MPDU. The group addressed MPDU includes the following address fields:

1. Address 1 field set to the group MAC Address.
2. Address 2 field set to the MAC Address of each AP transmitting the group addressed MPDU.
3. Address 3 field set to the MLD MAC Address of the STA MLD.

FIGS. 5A and 5B depict exemplary frames for transmission between MLDs in a multi-link operation according to embodiments of the present invention. For example, an STA in the STA MLD can broadcast an ARP Request frame via an individually addressed MPDU. In FIG. 5A, to transmit a group addressed frame, an ARP request frame in transmitted in an individually addressed message 505 (e.g., an MPDU) by a non-AP STA MLD. Specifically, for group addressed frame delivery in a multi-link operation, an STA (STA1) in an STA MLD transmits individually addressed MPDU to an AP (AP1) in an AP MLD. The Address 1 field of MPDU 505 is set to the MAC Address of AP1, the Address 2 field of MPDU 505 is set to the MAC Address of STA1, and the Address 3 field of MPDU 505 is set to the group MAC Address.

All APs in the AP MLD that received individually addressed message 505 broadcast a group addressed message 550 (e.g., an MPDU) depicted in FIG. 5B. The Address 1 field of MPDU 550 is set to the group MAC Address, the Address 2 field of MPDU 550 is set to the MAC Address of each AP transmitting the group addressed MPDU (e.g., AP1, AP2, and AP3), and the Address 3 field of MPDU 550 is set to the MLD MAC Address of the STA MLD.

All STAs in the STA MLD that transmitted individually addressed frame 505 can filter out the group addressed MPDUs 550 transmitted by the AP MLD. For example, the STAs of the non-AP STA MLD can filter out any received MPDUs that contain the MLD MAC Address of the non-AP STA MLD as the source address in the Address 3 field. Alternatively, an STA in the STA MLD can discard received group addressed MPDUs that contains a source address in Address 3 field identifying an STA of the non-AP STA MLD.

A target STA having the same IP address as the Target IP Address in the ARP Request frame transmits the ARP Response frame and includes the MLD MAC address of the non-AP STA MLD that is affiliated with the target STA in the Sender's MAC Address of the ARP response packet. When an AP in an AP MLD receives an ARP request from an associated STA (or from the DS) with a Target IP Address that corresponds to a second associated non-AP STA MLD, the AP inserts the MLD MAC Address of the second non-AP STA MLD as the Sender's MAC Address in the ARP response packet.

Figure 6:
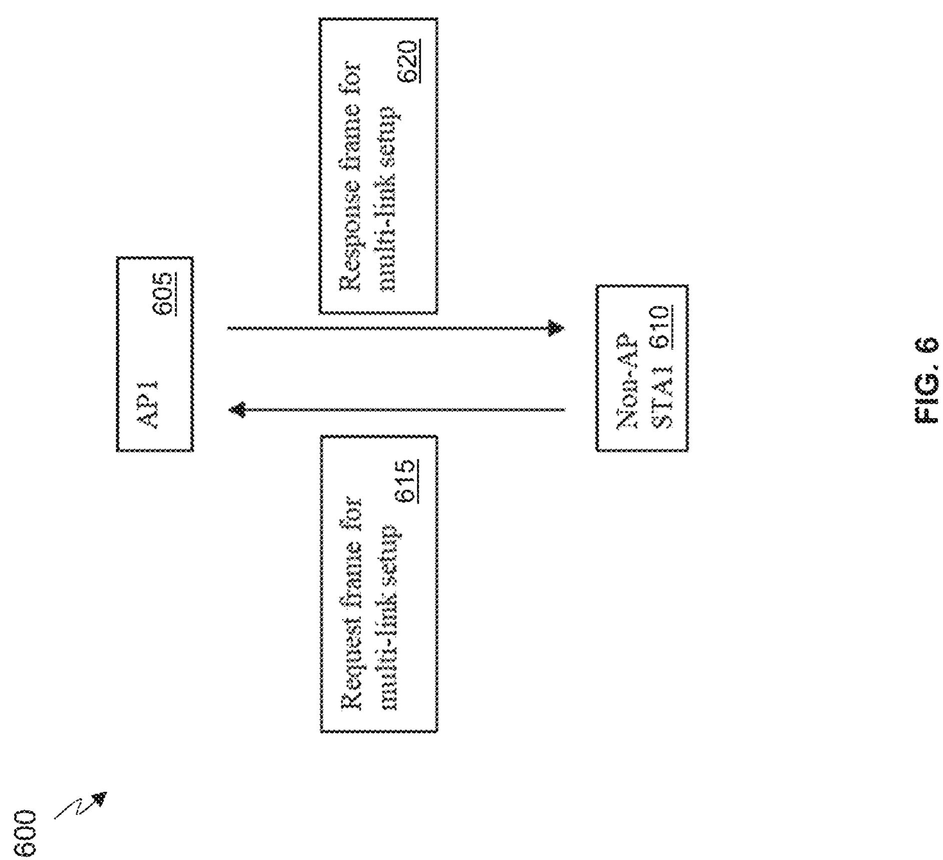
FIG. 6 is a block diagram depicting an exemplary computer implemented process of a multi-link setup procedure performed by multi-link devices according to embodiments of the present invention.

FIG. 6 is a block diagram depicting an exemplary computer implemented process of a multi-link setup procedure performed by multi-link devices according to embodiments of the present invention. As depicted in FIG. 1, STA1 (610) is a non-AP STA MLD that transmits request frame 615 for multi-link setup to AP1 (605). AP1 is an AP MLD that responds to STA1 with response frame 620 for multi-link setup. The MLDs use a MAC address that uniquely identifies the respective MLD management entity. The MLD MAC addresses can be used to identify and differentiate different MLDs and can be used for negotiations like security and block acknowledgment (BA).

Figure 7:
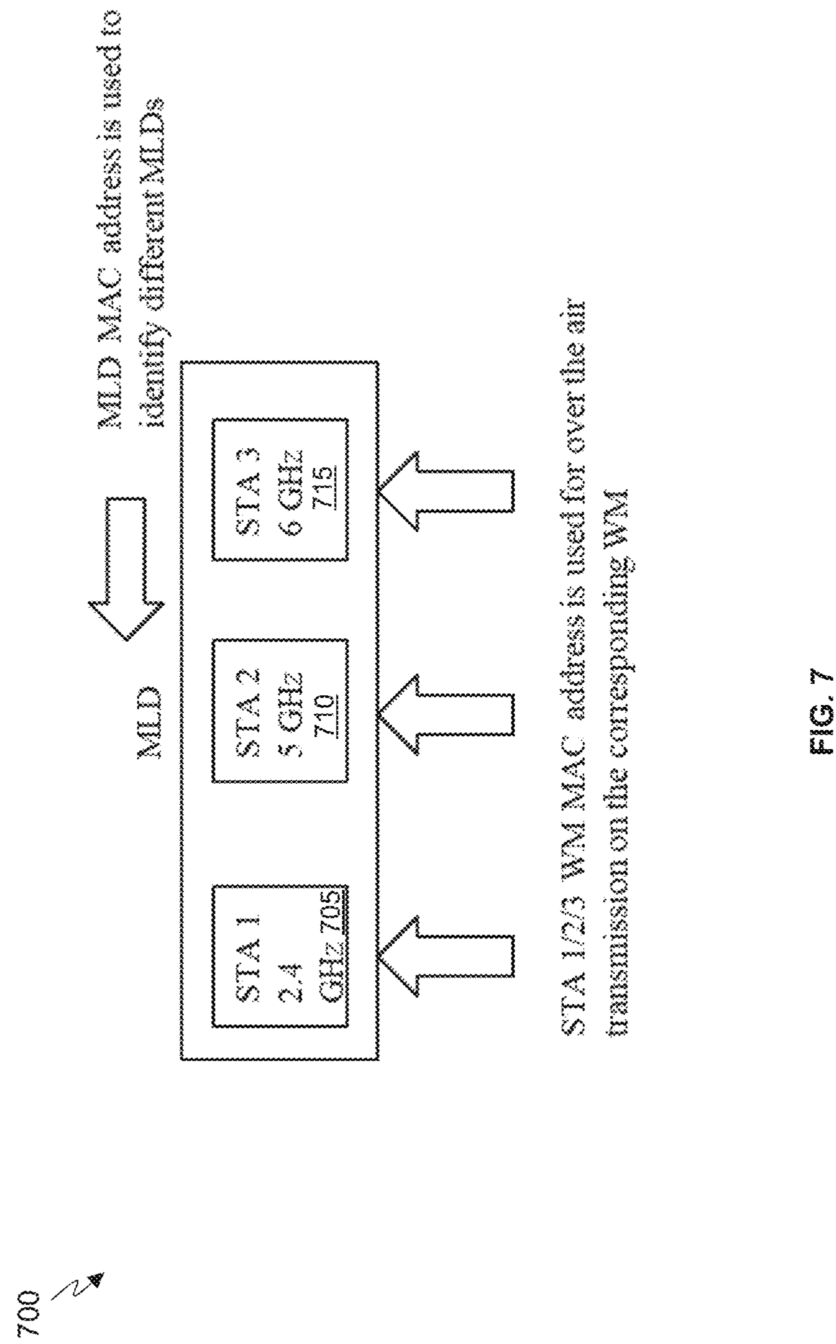
FIG. 7 depicts an exemplary non-AP STA MLD having three wireless STAs identified on corresponding wireless mediums using unique MAC addresses according to embodiments of the present invention. The non-AP STA MLD is associated with a unique MLD MAC address used to identify the non-AP STA MLD among many MLDs on a wireless network.

FIG. 7 depicts an exemplary non-AP STA MLD having three wireless STAs identified on corresponding wireless mediums using unique MAC addresses according to embodiments of the present invention. The non-AP STA MLD is associated with a unique MLD MAC address used to identify the non-AP STA MLD among many MLDs on a wireless network. The MAC address of STA1 710 can be provided during the multi-link setup procedure 700. STA wireless medium (WM MAC) addresses are used for transmission on the corresponding wireless medium. According to some embodiments, the MAC address of the associated AP is known before association. According to other embodiments, the AP MLD address is not known before association. In these embodiments, the AP MLD address may be provided during the multi-link setup procedure and can be used for security and BA negotiations. In the example of FIG. 7, MLD 700 includes STA1 (705) operating on a 2.4 GHz wireless link, STA1 (710) operating on a 5 GHz wireless link, and STA1 (715) operating on a 7 GHz wireless link. The MLD 700 is associated with an MLD MAC address that uniquely identifies the MLD management entity for identify and differentiating different MLDs. The respective MAC addresses of STA1, STA2, and STA3 are used for wireless transmission on the corresponding wireless medium. According to some embodiments, MLDs can be differentiated according to configuration details of the MLD. This can be useful when the MAC address of the MLD is not known prior to the multi-link setup procedure.

Figure 8:
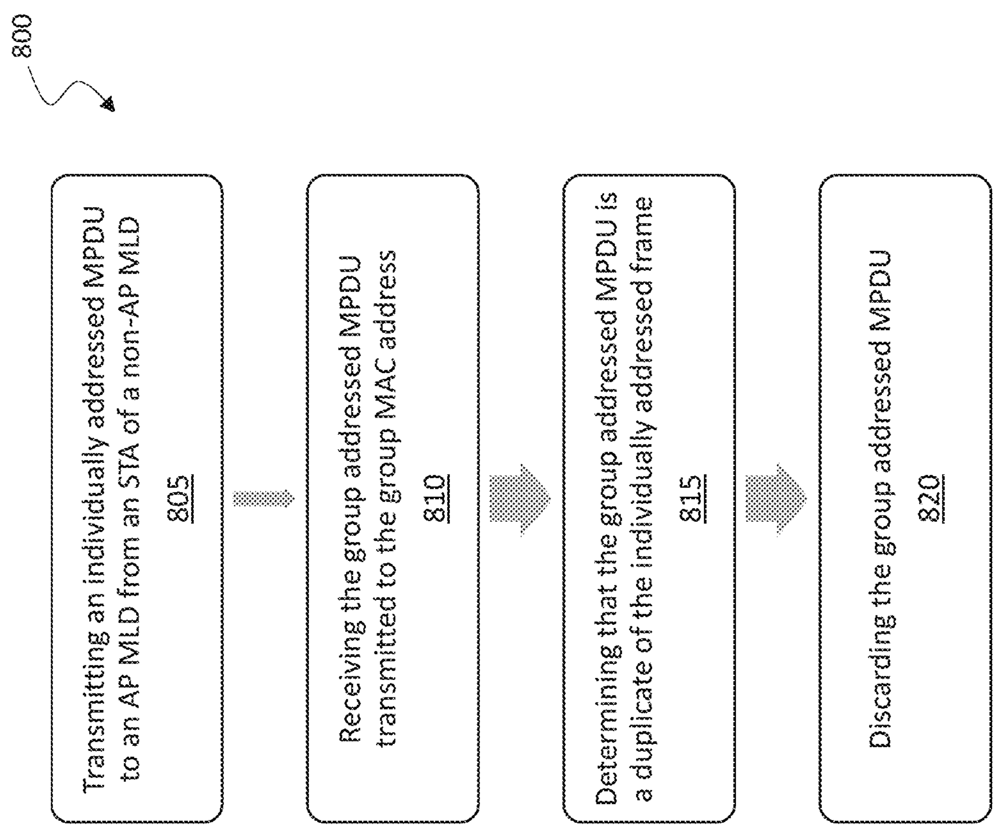
FIG. 8 is a flow chart depicting an exemplary sequence of computer implemented steps of a process for transmitting a group addressed frame over multiple wireless links in a wireless network using a multi-link device according to embodiments of the present invention.

FIG. 8 is a flow chart depicting an exemplary sequence of computer implemented steps of a process for transmitting a group addressed frame over multiple wireless links in a wireless network using a multi-link device according to embodiments of the present invention. The group addressed frame can include a MAC address uniquely identifying the non-AP STA MLD. The group addressed frame can include an ARP request frame for identifying an MLD MAC address of a target IP address, for example.

At step 805, an individually addressed MPDU is transmitted to an AP MLD from an STA of a non-AP STA MLD. The AP MLD broadcasts a group addressed MPDU over multiple wireless links responsive to receiving the individually addressed frame.

At step 810, the group addressed MPDU is received by the non-AP STA MLD.

At step 815, it is determined that the group addressed MPDU is a duplicate of the individually addressed frame transmitted by the STA of the non-AP STA MLD.

At step 820, the STA of the non-AP MLD discards the group addressed MPDU.

Figure 9:
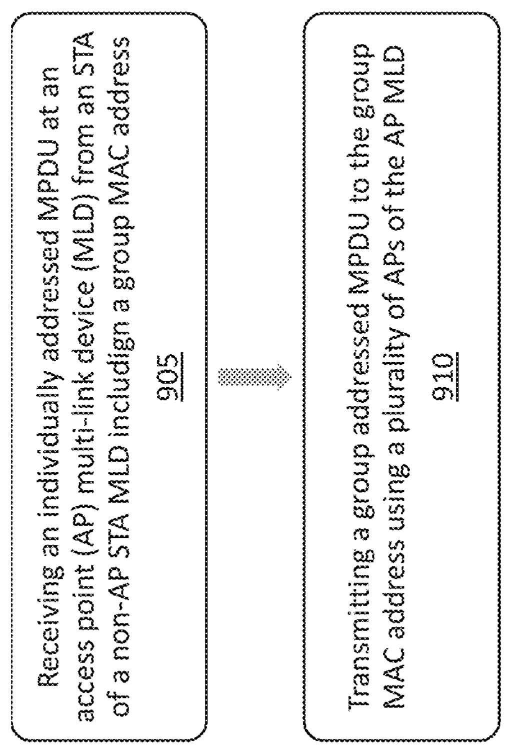
FIG. 9 is a flow chart depicting an exemplary sequence of computer implemented steps of a process 900 for transmitting a group addressed frame over multiple wireless links in a wireless network using a multi-link device according to embodiments of the present invention.

FIG. 9 is a flow chart depicting an exemplary sequence of computer implemented steps of a process 900 for transmitting a group addressed frame over multiple wireless links in a wireless network using a multi-link device according to embodiments of the present invention. The group addressed frame can include a MAC address uniquely identifying the non-AP STA MLD. The group addressed frame can include an ARP request frame for identifying an MLD MAC address of a target IP address, for example.

At step 905, an individually addressed frame is received by AP MLD from an STA of a non-AP STA MLD.

At step 910, the AP MLD broadcasts a group addressed frame over multiple wireless links responsive to receiving the individually addressed frame. The group addressed frame can be considered a duplicate of the individually addressed frame. The group addressed frame and the individually addressed frame can both include ARP request frames, for example.

Figure 10:
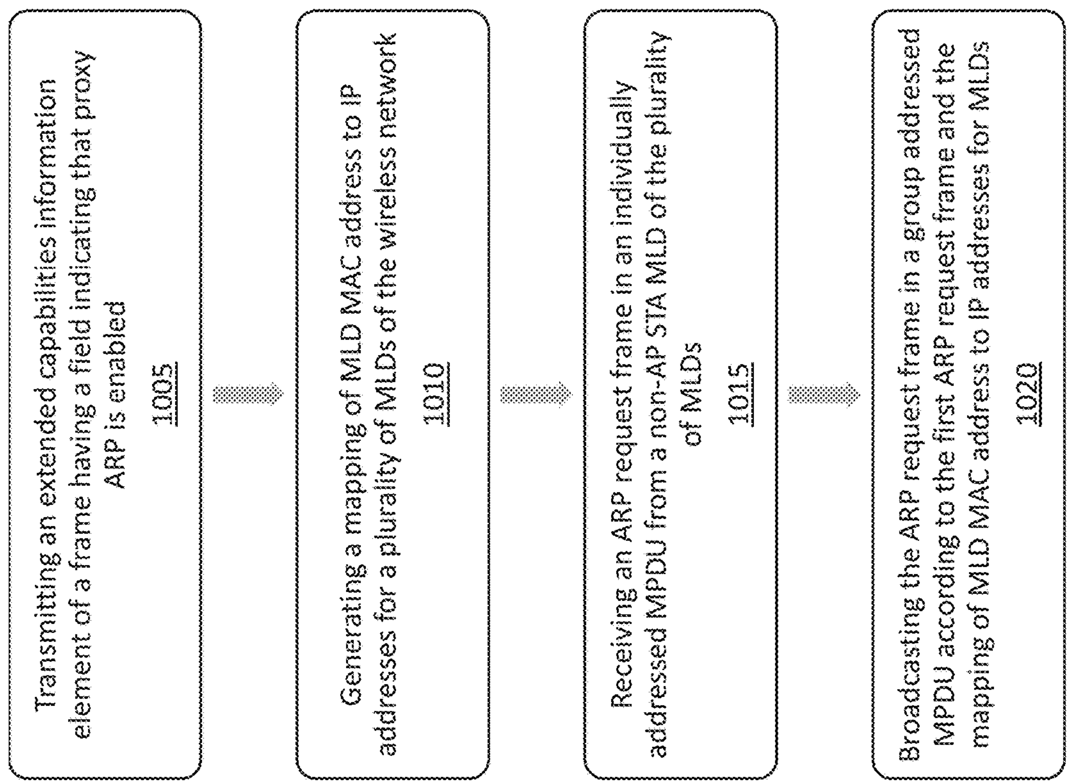
FIG. 10 is a flow chart depicting an exemplary sequence of computer implemented steps of a process of performing a proxy address resolution protocol (ARP) service for a multi-link device.

FIG. 10 is a flow chart depicting an exemplary sequence of computer implemented steps of a process 1000 of performing a proxy address resolution protocol (ARP) service for a multi-link device.

At step 1005, an extended capabilities information element of a frame having a field indicating that proxy ARP is enabled is transmitted by an AP MLD.

At step 1010, a mapping of MLD MAC address to IP addresses for a plurality of MLDs of the wireless network is generated by the AP MLD. The MLD MAC addresses can be determined according to a multi-link setup procedure, for example.

At step 1015, a first ARP request frame is received by an AP MLD in an individually addressed MPDU from a non-AP STA MLD of the plurality of MLDs.

At step 1020, a second ARP request frame is broadcast in a group addressed MPDU according to the first ARP request frame and the mapping of MLD MAC address to IP addresses for MLDs.

Exemplary Computer Controlled System

Figure 11:
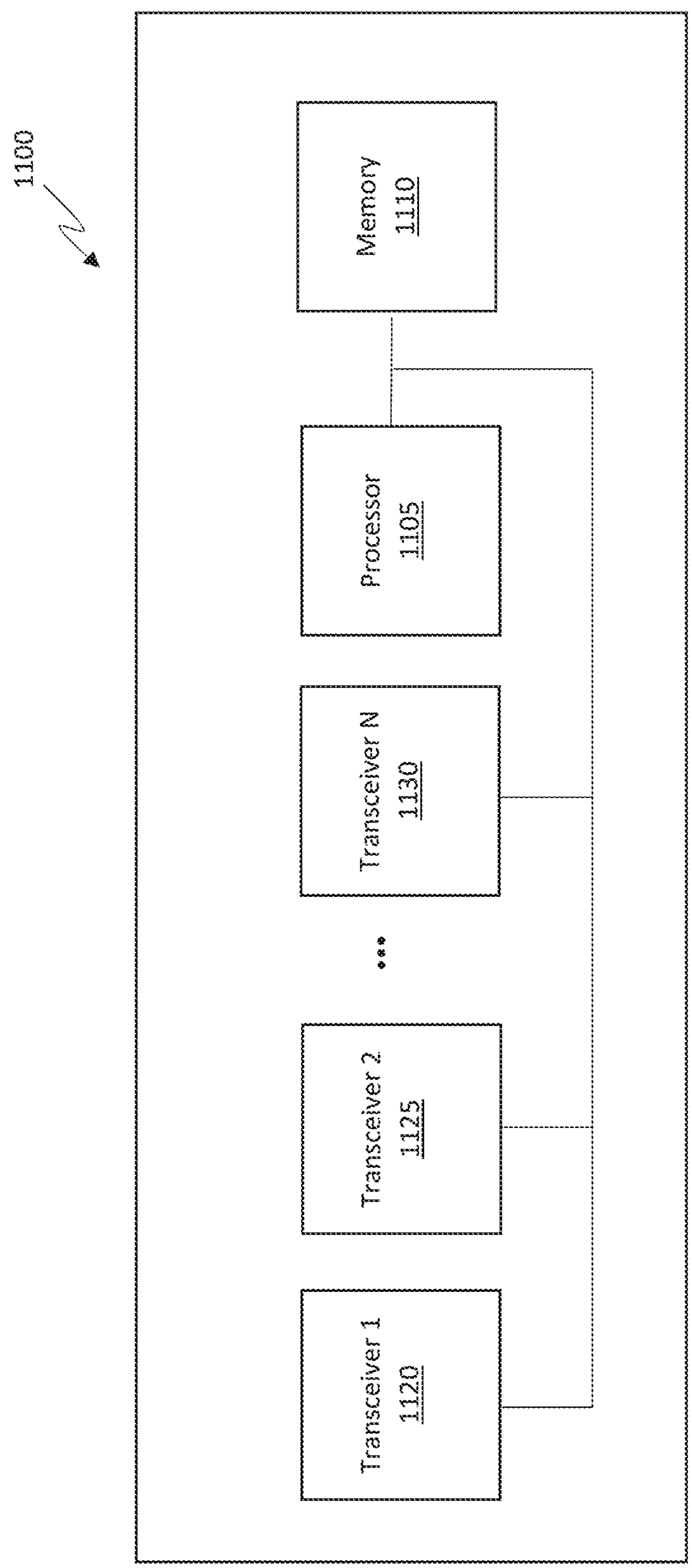
FIG. 11 is a block diagram depicting an exemplary computer system platform upon which embodiments of the present invention may be implemented.

FIG. 11 depicts an exemplary wireless device 1100 upon which embodiments of the present invention can be implemented. The wireless device 1100 can be an AP MLD or a non-AP STA MLD. Embodiments of the present invention are drawn to electronic systems capable of transmitting a group addressed frame that identifies an MLD according to an MLD MAC address. The group addressed frame can include an ARP request, for example, and can be transmitted by an AP MLD responsive to an individually addressed frame transmitted by a non-AP STA MLD associated with the AP MLD.

The wireless device 1100 includes a processor 1105 for running software applications and optionally an operating system. Memory 1110 can include read-only memory and/or random access memory, for example, to store applications and data for use by the processor 1105 and data received or transmitted by transceivers 1120, 1125, . . . and 1130. The wireless device 1100 can include fewer or more transceivers according to some embodiments. The transceivers 1120, 1125, . . . and 1130 communicate with other electronic devices over a wireless network (e.g., WLAN) and typically operates according to IEEE standards (e.g., IEEE 802.11ax, IEEE 802.11ay, IEEE 802.11be, etc.). The transceiver 1120,

1125, . . . and 1130 can communicate over a 2.4 GHz wireless link, a 5 GHz wireless link, and a 6 GHz wireless link, for example.

Embodiments of the present invention are thus described. While the present invention has been described in particular embodiments, it should be appreciated that the present invention should not be construed as limited by such embodiments, but rather construed according to the following claims.

What is claimed is:

1. An apparatus comprising:

a plurality of wireless transceivers;

a memory; and a processor operable to cause at least one of the plurality of wireless transceivers to:

transmit an individually addressed MPDU to an access point (AP) multi-link device (MLD), the individually addressed MPDU comprising:

a MAC address identifying an AP of the AP MLD;

a MAC address of a wireless station (STA) of the plurality of wireless transceivers; and a group MAC address for transmitting a group addressed MPDU; and receive the group addressed MPDU transmitted to the group MAC address.

2. The apparatus as described in claim 1, wherein the processor is further operable to cause at least one of the plurality of wireless transceivers to determine that the group addressed MPDU is a duplicate of the individually addressed MPDU.

3. The apparatus as described in claim 2, wherein the group addressed MPDU comprises an MLD MAC address associated with the plurality of wireless transceivers, and wherein the to determine that the group addressed MPDU is a duplicate of the individually addressed MPDU further comprises to determine that the MLD MAC address of the group addressed MPDU identifies the plurality of wireless transceivers.

4. The apparatus as described in claim 2, wherein the group addressed MPDU comprises an MLD MAC address associated with the plurality of wireless transceivers, and wherein to determine that the group addressed MPDU is a duplicate of the individually addressed MPDU further comprises to determine that the MLD MAC address of the group addressed MPDU identifies the STA.

5. The apparatus as described in claim 2, wherein the processor is further operable to filter out the group addressed MPDU responsive to the determining.

6. The apparatus as described in claim 1, wherein the group addressed MPDU comprises:

the group MAC address;

a plurality of addresses identifying respective APs of the AP MLD that transmit the group addressed MPDU; and an MLD MAC Address associated with the plurality of wireless transceivers.

7. The apparatus as described in claim 1, wherein the AP MLD is operable to transmit the group addressed frame responsive to the individually addressed MPDU.

8. An apparatus comprising:

a plurality of wireless transceivers;

a memory; and a processor operable to cause at least one of the plurality of wireless transceivers to:

receive an individually addressed MPDU from an STA of a non-AP STA MLD, the individually addressed MPDU comprising:

a MAC address identifying an access point (AP) of the plurality of wireless transceivers;

a MAC address of the STA of the non-AP STA MLD; and a group MAC address for transmitting a group addressed MPDU; and transmit the group addressed MPDU by a plurality of APs of the plurality of wireless transceivers, the group addressed MPDU comprising:

the group MAC Address;

a plurality of MAC addresses identifying the plurality of APs that transmit the group addressed MPDU; and an MLD MAC Address of the non-AP STA MLD.

9. The apparatus as described in claim 8, wherein the processor is further operable to perform a multi-link setup procedure with the non-AP STA MLD.

10. The apparatus as described in claim 8, wherein the multi-link setup procedure comprises receiving the MLD MAC address of the non-AP STA MLD during the multi-link setup procedure.

11. The apparatus as described in claim 10, wherein the MLD MAC address is included in an association request frame.

12. The apparatus as described in claim 8, wherein the processor is further operable to set a Proxy ARP field to 1 in an Extended Capabilities element of a frame transmitted to the non-AP STA MLD.

13. The apparatus as described in claim 12, wherein the processor is further operable to maintain an MLD MAC Address to IP mapping comprising a mapping of the MLD MAC Address of the non-AP STA MLD to an IP of the non-AP STA MLD.

14. The apparatus as described in claim 13, wherein the processor is further operable to update the MLD MAC Address according to IP mapping when the IP of the STA MLD changes.

15. An apparatus comprising:

a plurality of wireless transceivers;

a memory; and a processor operable to cause at least one of the plurality of wireless transceivers to:

transmit an extended capabilities information element of a frame having a field indicating that proxy ARP is enabled;

generate a mapping of MLD MAC addresses to IP addresses for a plurality of MLDs of a wireless network;

receive a first ARP request frame in an individually addressed MPDU from a non-AP STA MLD of the plurality of MLDs; and broadcast a second ARP request frame in a group addressed MPDU over multiple wireless links of the wireless network according to the first ARP request frame and the mapping of MLD MAC addresses to IP addresses.

16. The apparatus as described in claim 15, wherein the first ARP request frame comprises:

a MAC address identifying an AP of the plurality of wireless transceivers;

a MAC address of the an STA of the non-AP STA MLD; and a group MAC address for transmitting the group addressed MPDU.

17. The apparatus as described in claim 16, wherein the second ARP request frame comprises:

the group MAC Address;

a plurality of MAC addresses identifying a plurality of APs that transmit the group addressed MPDU; and an MLD MAC Address of the non-AP STA MLD.

18. The apparatus as described in claim 17, wherein the processor is further operable to perform a multi-link setup procedure with the non-AP STA MLD to determine the MLD MAC address of the non-AP STA MLD.

19. The apparatus as described in claim 15, wherein the processor is further operable to respond on behalf of the non-AP STA MLD to a third APR request.

20. The apparatus as described in claim 15, wherein the processor is further operable to:

respond to an Internet Control Message Protocol version 6 (IMPv6) Neighbor Solicitation message on behalf of the non-AP STA MLD; and transmit an unsolicited Neighbor Advertisement Messages on behalf of the STA MLD when an IP address of the non-AP STA MLD changes.

* * * * *